(12) United States Patent
Slattery et al.

(10) Patent No.: US 7,891,535 B2
(45) Date of Patent: *Feb. 22, 2011

(54) METHOD OF MAKING TAILORED BLANKS USING LINEAR FRICTION WELDING

(75) Inventors: Kevin T. Slattery, St. Charles, MO (US); Christopher H. Swallow, Kirkwood, MO (US); Loren J. Strahm, Florissant, MO (US)

(73) Assignee: The Boeing Company, Chicago, IL (US)

( * ) Notice: Subject to any disclaimer, the term of this patent is extended or adjusted under 35 U.S.C. 154(b) by 532 days.

This patent is subject to a terminal disclaimer.

(21) Appl. No.: 11/249,865

(22) Filed: Oct. 13, 2005

(65) Prior Publication Data

US 2007/0084905 A1 Apr. 19, 2007

(51) Int. Cl.
*B23K 20/12* (2006.01)
(52) U.S. Cl. ............... 228/112.1; 228/2.1; 156/73.5
(58) Field of Classification Search ............ 228/112.1, 228/2.1; 156/60, 73.5
See application file for complete search history.

(56) References Cited

U.S. PATENT DOCUMENTS

| | | | |
|---|---|---|---|
| 6,779,708 B2 * | 8/2004 | Slattery | 228/112.1 |
| 6,910,616 B2 | 6/2005 | Halley et al. | 228/112.1 |
| 2003/0168494 A1 * | 9/2003 | Halley et al. | 228/112.1 |
| 2005/0127140 A1 * | 6/2005 | Slattery | 228/112.1 |

FOREIGN PATENT DOCUMENTS

JP 3102444 B2 * 10/2000

* cited by examiner

*Primary Examiner*—Jessica L Ward
*Assistant Examiner*—Devang R Patel
(74) *Attorney, Agent, or Firm*—Ostrager Chong Flaherty & Broitman P.C.

(57) ABSTRACT

A method of making a tailored blank comprising the following steps: (a) friction welding first and second structural members together at a substantially right angle with respect to each other to form an intersection comprising a first joining surface formed by adjoining bottom faces of the first and second structural members, and a second joining surface formed by an angled face of the first structural member that is disposed at a first oblique angle relative to the bottom face of the first structural member; (b) friction welding the first joining surface of the intersection to a first portion of a surface of a base member; and (c) concurrently linear friction welding first and second joining surfaces of a third structural member to the second joining surface of the intersection and to a second portion of the surface of the base member respectively.

14 Claims, 10 Drawing Sheets

METHOD OF MAKING TAILORED BLANKS USING LINEAR FRICTION WELDING

BACKGROUND OF THE INVENTION

This invention relates to friction welding and, more specifically, to friction welding of one or more metal structural members to form a tailored blank.

Structural devices are often formed as assemblies of a number of smaller structural members made of metal. Such assembling of individual members may be necessary to form devices that are too large or too complicated to be formed by conventional manufacturing methods. For example, such factors as casting sizes, forging sizes, available plate and block sizes, and the like can limit the size and geometry of the structural members that can be manufactured. To form larger or more complex devices, the structural members are typically assembled by joining the individual structural members using a variety of known joining techniques including, for example, mechanical fastening or welding.

Joints formed by mechanical fasteners such as rivets, screws, and bolts typically require an overlap of the structural materials at the joint. The fasteners and the overlap of material result in an increase in weight of the joint and the structural assembly. The joint can also introduce areas of increased stress, for example, around holes drilled for receiving rivets. Alternatively, weld joints can be formed to join the structural members, sometimes requiring little or no overlap of material. However, the formation of conventional weld joints, such as by arc or electron beam welding, can result in undesirable dimensional changes in the structural members. Welding can also introduce porosity or other discontinuities into the structural members or otherwise cause unwanted changes to the material properties of the structural members.

Friction welding has also been proposed as an alternative to conventional welding methods for joining members. Linear friction welding and rotational friction welding can be used to form strong joints without reducing the mechanical characteristics of the joined materials or causing significant dimensional changes. Conventional linear and rotational friction welding require one member to be moved, i.e. oscillated or rotated, and urged against the other member.

It is known to friction weld structural members together to make a tailored blank [which terms are used interchangeably herein] that is later machined. Typically the tailored blank approximates the desired dimensions and configuration of the final structural assembly and therefore requires little machining or other subsequent processing to form the final structural assembly. The finished structural assemblies can be used as structural components of a vehicle, such as an aircraft, an automobile, or a marine craft. For example, a multiplicity of the structural assemblies can be joined to form a wing, wing support structure, fuselage, and the like of an airplane. Alternatively, the structural assemblies can be used in buildings, machinery, and the like.

Many structural assemblies have structural elements that intersect at substantially right angles. For example, numerous aircraft parts have stiffeners between two flanges, each stiffener having respective ends that intersect the respective flanges at substantially right angles. Both the flanges and stiffeners can be friction welded to the substrate or base member, but typically not to each other. A wedge block can be placed between a flange and a stiffener and friction welded in place to connect them. Alternatively, hydropillar welding can be used to friction weld stiffeners and flanges at their interfaces. The latter process involves drilling a hole in the parts at their interface and then rotating a rod and forcing it into the hole. The taller the structural members being welded together, the greater the diameter of the hole needed for hydropillar welding. This results in higher costs for machining and material.

There is a need for improvements in the art of friction welding metal structural members together at substantially right angles in order to minimize costs.

BRIEF DESCRIPTION OF THE INVENTION

The invention is directed to methods of friction welding structural members or elements to make tailored blanks that can be further processed into final structural assemblies. In the disclosed embodiments, an angled block is friction welded to one structural member, such as a flange, to form an intersection, and then that intersection is friction welded to a base member or substrate. The opposite of the angle will be machined out of a second structural member, such as a stiffener, allowing the second structural feature to be linear friction welded to the angled block and to the base member. This eliminates the need for the first and second structural members to be joined by hydropillar friction welding. The foregoing method can be employed in the manufacture of tailored blanks for complex structural assemblies.

In the disclosed embodiments, the angled block has a pair of mutually parallel side faces in the shape of a right triangle or a right trapezoid. As used herein, the term "right trapezoid" means a trapezoid having two substantially right angles.

One aspect of the invention is a method of making a tailored blank comprising the following steps: (a) friction welding first and second structural members together at a substantially right angle with respect to each other to form an intersection comprising a first joining surface formed by adjoining bottom faces of the first and second structural members, and a second joining surface formed by an angled face of the first structural member that is disposed at a first oblique angle relative to the bottom face of the first structural member; (b) friction welding the first joining surface of the intersection to a first portion of a surface of a base member; and (c) concurrently linear friction welding first and second joining surfaces of a third structural member to the second joining surface of the intersection and to a second portion of the surface of the base member respectively.

Another aspect of the invention is a method of making a tailored blank comprising the following steps: (a) friction welding a first joining surface of a first structural member in the shape of a right triangle or right trapezoid to a first portion of a first surface of a second structural member, the first structural member having a second joining surface that is substantially normal to the first joining surface thereof and a third joining surface that is disposed at an oblique angle relative to the second joining surface thereof, the second joining surface of the first structural member being substantially coplanar with a joining surface of the second structural member when the first and second structural members have been friction welded together; (b) concurrently friction welding the joining surface of the second structural member and the second joining surface of the first structural member to first and second portions respectively of a surface of a base member; and (c) concurrently linear friction welding first and second joining surfaces of a third structural member to the third joining surface of the first structural member and to a third portion of the surface of the base member respectively.

A further aspect of the invention is a method of making a tailored blank comprising the following steps: (a) friction welding a first structural member having a substantially right triangular or substantially right trapezoidal cross section to one side of a second structural member to form a T-shaped intersection in which respective bottom faces of the first and second structural members are substantially coplanar; (b) friction welding a third structural member having a substantially right triangular or substantially right trapezoidal cross section to another side of the second structural member, thereby changing the T-shaped intersection into a cross-shaped intersection in which a bottom face of the third structural member is substantially coplanar with the bottom faces of the first and second structural members, the bottom faces for the first through third structural members forming a joining surface of the cross-shaped intersection; and (c) friction welding the joining surface of the cross-shaped intersection to a portion of a surface of a base member. The use of the term "substantially" to describe the geometry of a structural member having a polygonal cross section is intended to broaden the definition of the particular geometric shape in issue to take into account that the polygonal shape is not ideal, but rather may, for example, be rounded or beveled at the vertices of the polygon, since metal structural members typically do not have precise edges at the junctions of faces.

Yet another aspect of the invention is a method of making a tailored blank comprising the following steps: (a) placing a first flat surface of a first structural member having a cross section in abutting relationship with a portion of a first flat surface of a second structural member to form a first interface, the first structural member further comprising a second flat surface that is substantially normal to the first flat surface of the first structural member, and a third flat surface disposed at an oblique angle relative to the second flat surface, (b) applying a force that causes an increase in pressure at the first interface; and (c) rubbing the abutting surfaces at the first interface together while step (b) is being performed and until sufficient frictional heat has been generated that material at the first interface plasticizes, wherein step (c) is halted after the material at the first interface becomes plastic while step (b) continues to be performed until the plastic material welds the first and second structural members together to form an intersection having a bottom face consisting of the second flat surface of the first structural member and a second flat surface of the second structural member, the method further comprising the following steps: (d) placing the bottom face of the first intersection in abutting relationship with a portion of a flat surface of a base member to form a second interface; (e) applying a force that causes an increase in pressure at the second interface; and (f) rubbing the abutting surfaces at the second interface together while step (e) is being performed and until sufficient frictional heat has been generated that material at the second interface plasticizes, wherein step (f) is halted after the material at the second interface becomes plastic while step (e) continues to be performed until the plastic material at the second interface forms a weld at the intersection to the base member.

Other aspects of the invention are disclosed and claimed below.

DETAILED DESCRIPTION OF THE INVENTION

Figure 1:
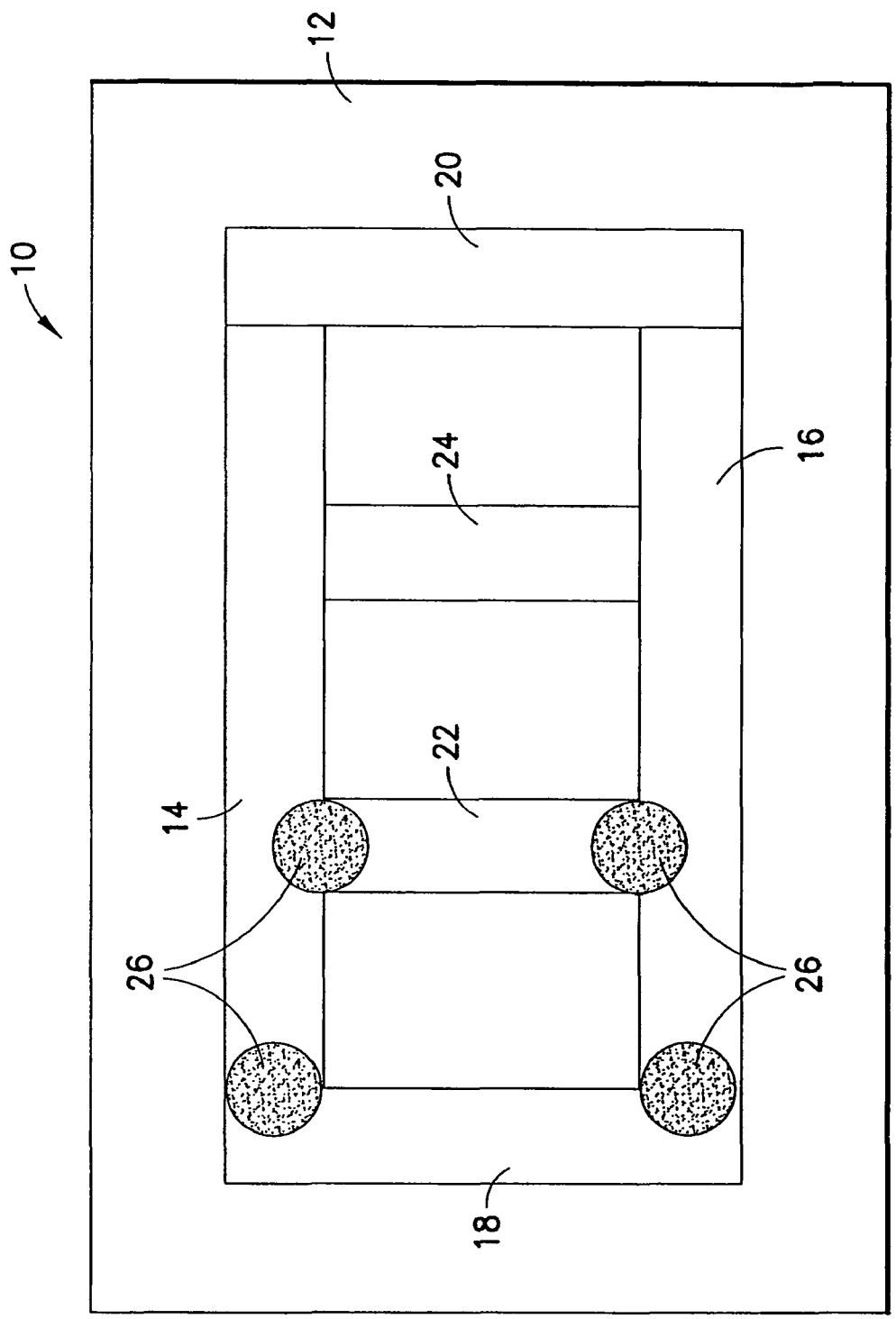
FIG. 1 is a drawing showing a top view of a tailored blank having stiffener welded to flanges by conventional hydropillar friction welding.

FIG. 1 shows a tailored blank 10 made by conventional hydropillar friction welding. The tailored blank 10 comprises first and second flanges 14 and 16, first and second end connectors 18 and 20, and first and second stiffeners 22 and 24, all welded to a substantially planar base member or substrate 12. The various structural members (i.e., flanges, end connectors and stiffeners) are connected in the manner shown using hydropillar friction welding at the respective intersections of the structural members. Only four such hydropillar friction welds 26 are shown in FIG. 1, while the interfaces where flanges 14 and 16 contact the stiffener 24 and the end connector 20 are shown as being not yet hydropillar friction welded, although each of structural members 14, 16, 20 and 24 have been friction welded to the base member 12. The present invention uses linear friction welding instead of hydropillar friction welding.

In a linear friction welding process, respective substantially planar surfaces of two parts are placed in contact with each other to form an interface and then rubbed together in a reciprocating manner. This is accomplished by moving at least one of the parts back and forth along a line. As the parts are rubbed, compressive force is applied to place the interface under high pressure. At the interface, frictional heat is generated and material from each part becomes plasticized. Some of this material flows out from between the parts (flash flow), resulting in gradual decrease in the thickness, i.e. the dimension in the direction in which pressure is applied (the dimension substantially normal to the interface) of the parts. When the process is terminated, flash flow ceases, and at the interface, the remaining plasticized material forms a weld, thereby bonding the two parts together.

The present invention is directed to methods of manufacturing tailored blanks having right-angled intersections using friction welding processes. In general, two structural members are joined at a substantially right angle by friction welding to form an intersection having a first joining surface formed by the bottom faces of the two structural members and having a second joining surface formed by a inclined face of an angled one of the structural members that is disposed at an oblique angle relative to the first joining surface. The first joining surface of the intersection is then friction welded to a base member or substrate. Thereafter a third structural member is concurrently linear friction welded to the intersection and to the base member. The third structural member also has a joining surface disposed at the same oblique angle as the second joining surface, the former being welded to the latter during the linear friction welding operation.

Various embodiments will be described with reference to the drawings, in which similar elements in different drawings bear the same reference numerals.

Figure 2:
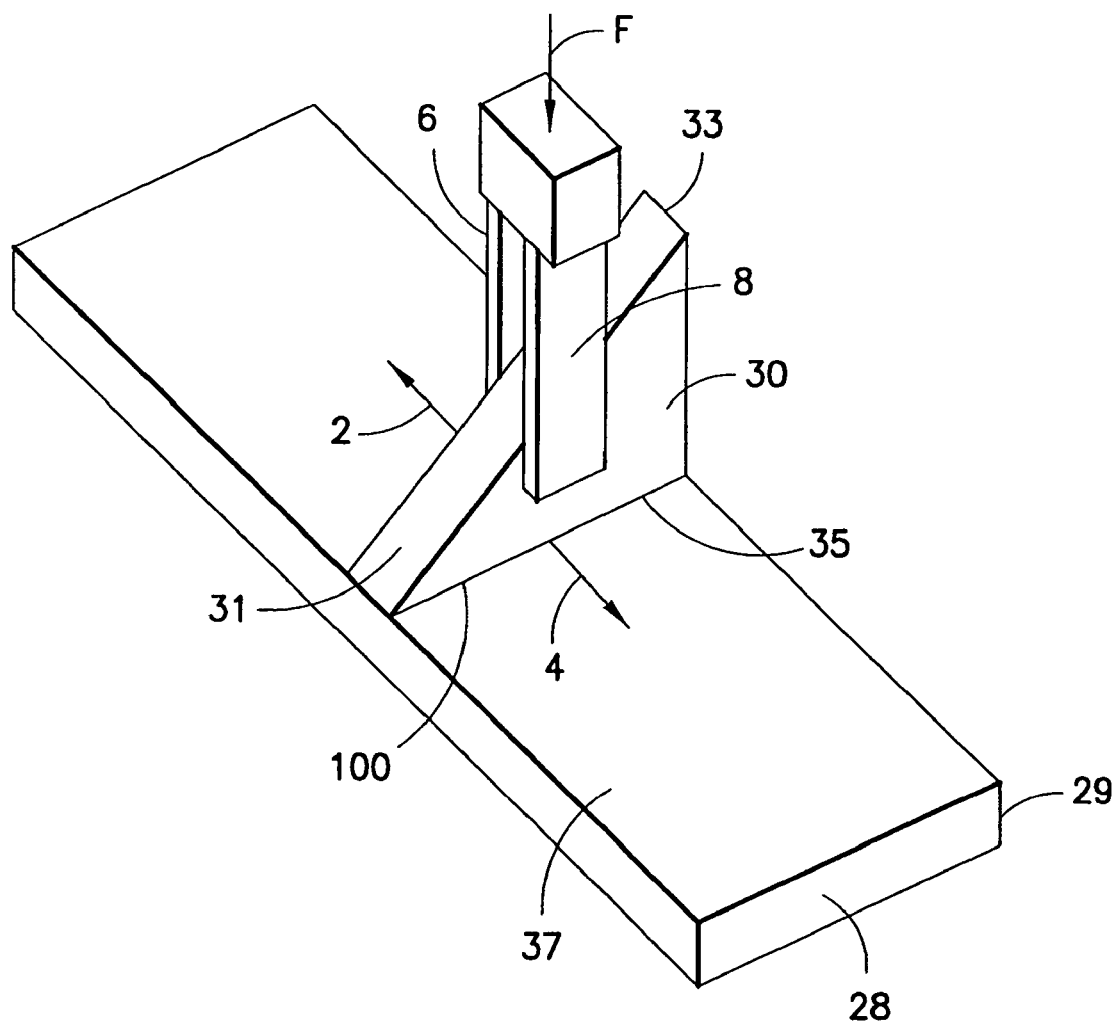
FIG. 2 is a drawing showing an isometric view of a first stage in the manufacture of a tailored blank in accordance with a first embodiment wherein an angled first structural member has been welded to a second structural member by friction welding to form a T-shaped intersection.
Figure 3:
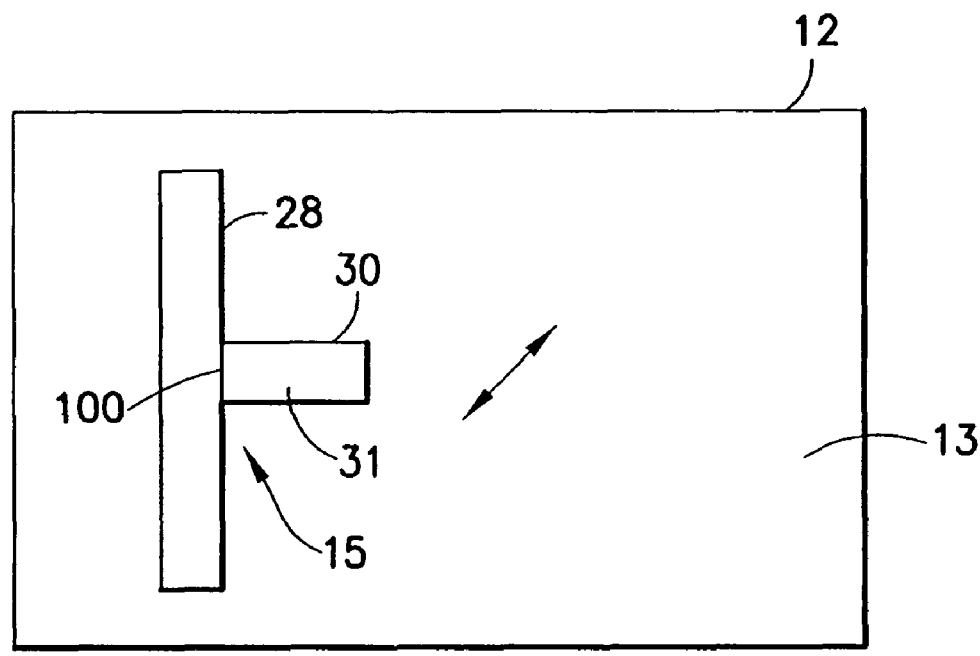
FIG. 3 is a drawing showing a top view of a second stage in the manufacture of a tailored blank in accordance with the first embodiment wherein the T-shaped intersection has been friction welded to a base member or substrate.
Figure 4:
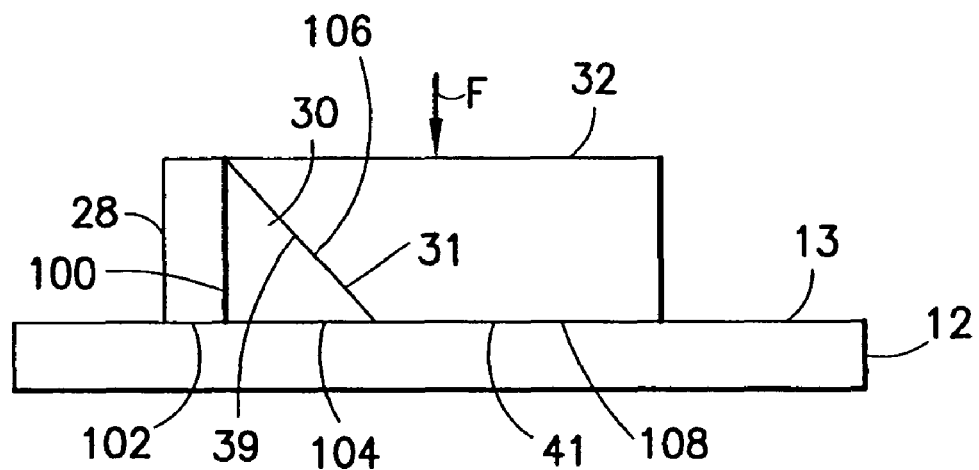
FIG. 4 is a drawing showing a side view of a third stage in the manufacture of a tailored blank in accordance with the first embodiment wherein a third structural member has been welded to the angled first structural member and to the base member by linear friction welding.

Various stages in the manufacture of a tailored blank in accordance with a first embodiment are shown in FIGS. 2-4. Referring to FIG. 2, a first structural member 30 in the form of an angled block or plate having a pair of substantially right triangular side faces is being joined at substantially right angles to a second structural member 28 by means of friction welding. Although linear friction welding (meaning that the relative motion of the structural members during oscillation is linear) is preferred, the relative motion may have a nonlinear component.

Structural member 28 is shown in FIG. 2 as being a substantially rectangular block or plate, but may be substantially trapezoidal or some other shape. Structural member 30 is shown in FIG. 2 as being a substantially triangular plate, but may be substantially right trapezoidal or some other polygonal shape having a substantially right angle. For the sake of simplicity, the structural members 28 and 30 are shown in FIG. 2 as having the same height and same thickness. However, those relationships are not requirements of the invention.

In the particular example depicted in FIG. 2, the structural member 30 has five faces, including a pair of congruent substantially right triangular side faces and three substantially rectangular faces 31, 33, 35 that meet the side faces at respective edges. As used herein, the term "edge" encompasses a sharp edge as well as an edge that is not sharp, such as an edge that has been radiused or beveled. Each of the five faces of structural member 30 comprises a substantially planar surface. As seen in FIG. 2, the structural member 30 has an inclined face 31 disposed at an oblique angle relative to face 33 thereof, while faces 33 and 35 are disposed at a substantially right angle relative to each other.

The structural member 28 in the example seen in FIG. 2 is a parallelepiped with six substantially rectangular faces, each face comprising a substantially planar surface. The structural member 30 is friction welded to a portion of one of the two faces of structural member 28 having the largest area, namely, face 37.

In the example shown in FIG. 2, structural member 30 is friction welded to structural member 28 by urging face 35 of structural member 30 against a portion of face 37 of structural member 28 and causing structural member 30 to move relative to structural member 28 in a repeating pattern at a high frequency. More specifically, structural member 30 can be reciprocated in opposite directions 2 and 4 along a line while being urged or pressed against structural member 28 in a direction F that is substantially normal to surface 37 of the latter. [Friction welding resulting from relative motion of the welded parts along a line will be referred to herein as "linear friction welding."] The structural member 30 can be urged against structural member 28 and reciprocated by an actuator (not shown), such as an electric, hydraulic, or pneumatic actuator that is coupled to the structural member 30 by means of a pair of adjustable jaws 6, 8 or other coupling device such as clamps or a chuck. The structural member 30 can be secured to the coupling device by bolts, tack welding, tooling, or the like. In the case of jaws 6, 8, each jaw may be provided with a knurled gripping surface for securely gripping the structural member being friction welded. The actuator is preferably designed to oscillate the structural member 30 a distance of about 0.1 inch at a rate of about 60 hertz. Alternatively, other oscillation distances and frequencies can be used.

The frequency of the reciprocating movement and the applied pressure are selected to cause the materials at the surfaces being rubbed together to plasticize, reaching a state wherein the parts will become fused together when reciprocation ceases and the plasticized material is allowed to fuse while the pressure is still being applied. More specifically, the relative motion of the structural members 28 and 30 generates frictional heating that plasticizes a portion of the structural member 28 and/or a portion of the structural member 30. Once sufficient plasticization has occurred, the reciprocating motion of the structural member 30 is terminated. Plasticization can be detected, for example, by mechanical or optical measurements, or friction welding can be continued for a predetermined duration based upon such factors as the type of materials being joined, the size or type of the joint to be formed, and the compressive force therebetween.

After the oscillatory motion of structural member 30 has been terminated, the compressive force between structural members 28 and 30 can be maintained by continuing to urge structural member 30 in direction F against structural member 28, thereby forming a friction weld joint 100 (indicated in FIG. 2) at the interface of face 35 of structural member 30 and face 37 of structural member 28. More precisely, face 35 of structural member 30 and a corresponding contacting portion of face 37 of structural member 28 form respective substantially planar joining surfaces that are joined by the weld joint 100.

It should be appreciated that the forces and ranges of motion required for linear friction welding of the structural members 28 and 30 can vary according to such factors as the material they are made from, their dimensions, their surface finishes, and the like. For example, in accordance with one implementation of the first embodiment, in which the members 28 and 30 are formed of aluminum, structural member 30 is urged in direction F against structural member 28 with a force sufficient to produce a pressure of about 20,000 psi at their interface, while structural member 30 is reciprocated about 0.1 inch alternatingly in directions 2, 4 seen in FIG. 2.

In other embodiments, the structural member 30 can be reciprocated in directions other than those indicated by arrows 2, 4 in FIG. 2 while being urged against the structural member 28. Further, it should be appreciated that while the motion of the structural member 30 is substantially linear in alternating directions, the motion of structural member 30 can have some nonlinear component of motion, e.g., so that the motion of structural member 30 relative to structural member 28 defines an elliptical path.

The result of friction welding structural members 28 and 30 together in the manner shown in FIG. 2 is a T-shaped intersection 15 wherein the angled block or plate 30 forms the stem of the T and the faces 29 and 33 are substantially coplanar, thus forming a T-shaped bottom face of the intersection 15. The respective positions of the structural members 28 and 30 are precisely controlled during the friction welding operation so that the faces 29 and 33 are within 0.005 inch of each other when the weld has been formed. Any flash projecting out of the plane of the bottom face of intersection 15 is then removed by grinding.

In the next manufacturing stage shown in FIG. 3, the T-shaped intersection 15 is placed atop a base member or substrate 12, which is a plate having a substantially planar top surface 13. The bottom face of the intersection 15 is placed in abutting relationship with a portion of the top surface 13 of the base member 12. The intersection 13 is then friction welded to the base member 12 by urging the bottom face of the intersection 13 against the top surface 13 of the base member 12 and causing the intersection 15 to move relative to the base member 12 in a repeating pattern at a high frequency. The intersection 15 is reciprocated in opposite directions along a line while being urged or pressed against the base member 12 in a direction that is substantially normal to the top surface of the latter. Again, the intersection 15 can be urged against the base member 12 and reciprocated by an actuator (not shown), such as an electric, hydraulic, or pneumatic actuator that is coupled to the intersection by means of adjustable jaws, clamps or other coupling devices. For example, respective pairs of jaws or clamps may be coupled to the structural member 28 on opposite sides of its interface with the structural member 30, the supporting structure for both pairs of jaws or clamps being mechanically linked so that the respective sets of jaws or clamps can be moved in unison by a single actuator. If required for particular constructions of the intersection, a third set of jaws or clamps can be coupled to the structural member 30 and moved in unison with the first two sets of jaws or clamps.

To reduce shearing forces at the weld joint 100 during friction welding of intersection 15 to base member 12, it is preferred that intersection 15 reciprocate along a line that is not orthogonal to the midplane between the triangular side faces of structural member 30, i.e., not parallel to the weld joint 100. For example, the intersection 15 may reciprocate along a line that is disposed at a 45-degree angle relative to the weld joint 100, as indicated by the double-headed arrow in FIG. 3, or along a line that is substantially orthogonal to the weld joint 100 (not shown in FIG. 3).

After the motion of intersection 15 has been terminated, the compressive force between intersection 15 and base member 12 can be maintained by continuing to urge intersection 15 in a direction substantially normal to the top surface 13 of base member 12 as the plasticized material at the interface of base member 12 and intersection 15 forms a weld joint. As seen in FIG. 4, the weld joint at the interface of base member 12 and intersection 15 comprises a weld joint 102 between structural member 28 and base member 12 and a weld joint 104 between structural member 30 and base member 12, which weld joints 102 and 104 may be connected. More precisely, the bottom face (item 29 in FIG. 2) of structural member 28 and a first corresponding contacting portion of the top surface of base member 12 form respective substantially planar joining surfaces that are joined by weld joint 102, while the bottom face (item 35 in FIG. 2) of structural member 30 and a second corresponding contacting portion of the top surface of base member 12 form respective substantially planar joining surfaces that are joined by weld joint 104. FIG. 3 shows intersection 15 welded to the base member 12, with face 31 of structural member 30 being disposed at an oblique angle relative to the top surface 13 of base member 2.

Thereafter, an angled third structural member 32 is concurrently joined to base member 12 and intersection 15 by linear friction welding to form the tailored blank seen from the side in FIG. 4. In accordance with the example shown in FIG. 4, the angled structural member 32 has six faces, including mutually parallel side faces each having a substantially trapezoidal shape. Two of the other faces (i.e., 39 and 41 in FIG. 4) comprise substantially planar surfaces that are disposed at an obtuse interior angle relative to each other, which obtuse angle is the supplement of the angle between faces 31 and 33 of the angled structural member 30 (see FIG. 2). In the particular example depicted in FIG. 4, the third structural member 32 has a right trapezoidal profile with one inclined face 39 that is disposed at the same oblique angle as the inclined face 31 of structural member 30. When structural member 32 is placed with its inclined face 39 in abutment with the inclined face 31 of structural member 30 and with its bottom face 41 in abutment with a corresponding portion of the top surface 13 of base member 12, the two structural members 30 and 32 fit together to form a structure that is substantially rectangular in profile and that extends substantially normal to structural member 28.

While structural member 32 is in the position seen in FIG. 4, the structural member 32 is concurrently joined to intersection 15 and to base member 12 by linear friction welding. First, the intermediate structure comprising intersection 15 welded to base member 12 is securely fixed by clamps. Then structural member 32 is placed between a pair of adjustable jaws (not shown), which are adjusted to grasp the side faces of structural member 32. The jaws are initially positioned such that structural member 32 occupies the position shown in FIG. 4, wherein the inclined face 39 of structural member 32 forms a substantially planar joining surface that abuts the substantially planar joining surface formed by the inclined face 31 of structural member 30 and at the same time the bottom face 41 of the structural member 32 forms a substantially planar joining surface that abuts a third corresponding contacting portion of the top surface of base member 12. The bottom faces of structural members 30 and 32 are adjacent to each other as shown in FIG. 4.

Still referring to FIG. 4, structural member 32 is friction welded to base member 12 by causing structural member 32 to reciprocate relative to base member 12 in opposite directions along a line (in and out of the sheet as viewed in FIG. 4) while being urged or pressed against base member 12 in a direction F that is substantially normal to the top surface of base member 12. At the same time, a vector component of the force being exerted in direction F presses inclined face 39 of structural member 32 against the inclined face 31 of structural member 30. As previously disclosed, structural member 32 can be urged against the base member 12 and reciprocated by an actuator (not shown), such as an electric, hydraulic, or pneumatic actuator that is coupled to structural member 32 by means of the aforementioned jaws.

The relative motion between structural member 32 and the intermediate structure formed by intersection 15 welded to base member 12 generates frictional heating that plasticizes respective portions of structural members 30 and 32 at the interface of the inclined faces 31 and 39, and that concurrently plasticizes respective portions of structural member 32 and base member 12 at the interface of bottom face 41 of structural member 32 and the third corresponding contacting portion of the top surface 13 of base member 12.

Once sufficient plasticization has occurred, the reciprocating motion of structural member 32 is terminated. Thereafter, the compressive force between structural member 32 and base member 12 is maintained by continuing to urge structural member 32 in direction F against base member 12. At the same time, a vector component of the force being exerted in direction F presses inclined face 39 of structural member 32 against the inclined face 31 of structural member 30. Under compression, the plasticized material at the interface of inclined faces 31 and 39 and at the interface of bottom face 41 and top surface 13 forms weld joints 106 and 108, which meet at the termination of weld joint 104. Weld joints 102, 104 and 108 lie in the same plane and form a single continuous weld joint that joins the three structural members 28, 30 and 32 to the base member 12, while weld joint 106 is inclined at an oblique angle relative to weld joint 104.

After all of the structural members 28, 30, 32 have been welded in place, as illustrated in FIG. 4, the resulting structure forms a tailored blank that can be trimmed to form a desired final structural assembly. The tailored blank can be trimmed by any known means, including using a manual machining device or a computer-guided machining device such as a computer numeric control (CNC) machine. During machining, portions of the base member 12 and/or the structural members 28, 30, 32 can be removed. Preferably, the tailored blank is trimmed according to predetermined dimensions corresponding to a desired configuration of the final structural assembly (not shown in the drawings). Also, flash produced during the friction welding operations can be removed by trimming.

A method for manufacturing a tailored blank of the type depicted in FIG. 1 will now be described with reference to FIGS. 5-8. To simplify the illustrations, an exemplary embodiment will be disclosed in which all of the structural members have the same height and same thickness. In addition, to facilitate increasing their scale, FIGS. 7 and 8 each depict an incomplete tailored blank. When completed, the tailored blank partially depicted in FIG. 8 will have a structure similar to that seen in FIG. 1.

Figure 5:
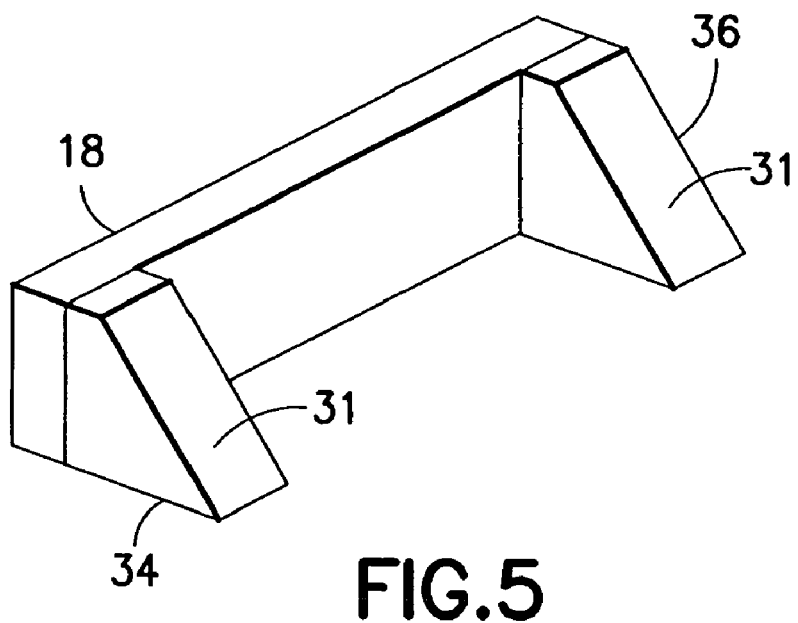
FIG. 5 is a drawing showing an isometric view of a stage in the manufacture of a tailored blank in accordance with a second embodiment wherein angled first and second structural members have been welded to a third structural member by friction welding to form two corners.

FIG. 5 shows a stage in a method of manufacturing a tailored blank in accordance with a second embodiment wherein angled structural members 34 and 36 have been friction welded to a structural member 18 to form two corners. Each of structural members 34 and 36 is joined at substantially right angles to structural member 18. Structural member 18 is a substantially rectangular block or plate having six faces. Each of structural members 34 and 36 has six faces, including a pair of congruent substantially right trapezoidal side faces and four substantially rectangular faces that meet the side faces at respective edges. Each of the six faces of structural members 34 and 36 comprises a substantially planar surface. As seen in FIG. 5, each of structural members 34 and 36 has an inclined face 31 disposed at an oblique angle relative to the bottom face thereof. The structural members 34 and 36 are friction welded to respective portions of one of the two faces of structural member 18 having the largest area.

After each of structural members 34 and 36 has been friction welded to structural member 18 as shown in FIG. 5, any flash is removed from the bottom faces by grinding. The respective positions of these structural members are precisely controlled during the friction welding operations so that the bottom faces of structural members 18, 34 and 36 are substantially coplanar. The resulting dual-intersection structure can be placed with its bottom face in abutting relationship with a base member and friction welded thereto in the course of manufacturing the tailored blank partly depicted in FIG. 8, as will be explained in further detail later.

Figure 6:
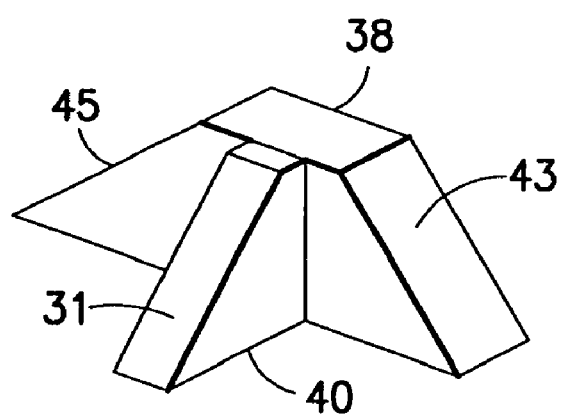
FIG. 6 is a drawing showing an isometric view of a stage in the manufacture of a tailored blank in accordance with a third embodiment wherein angled first and second structural members have been friction welded to form a T-shaped intersection.
Figure 8:
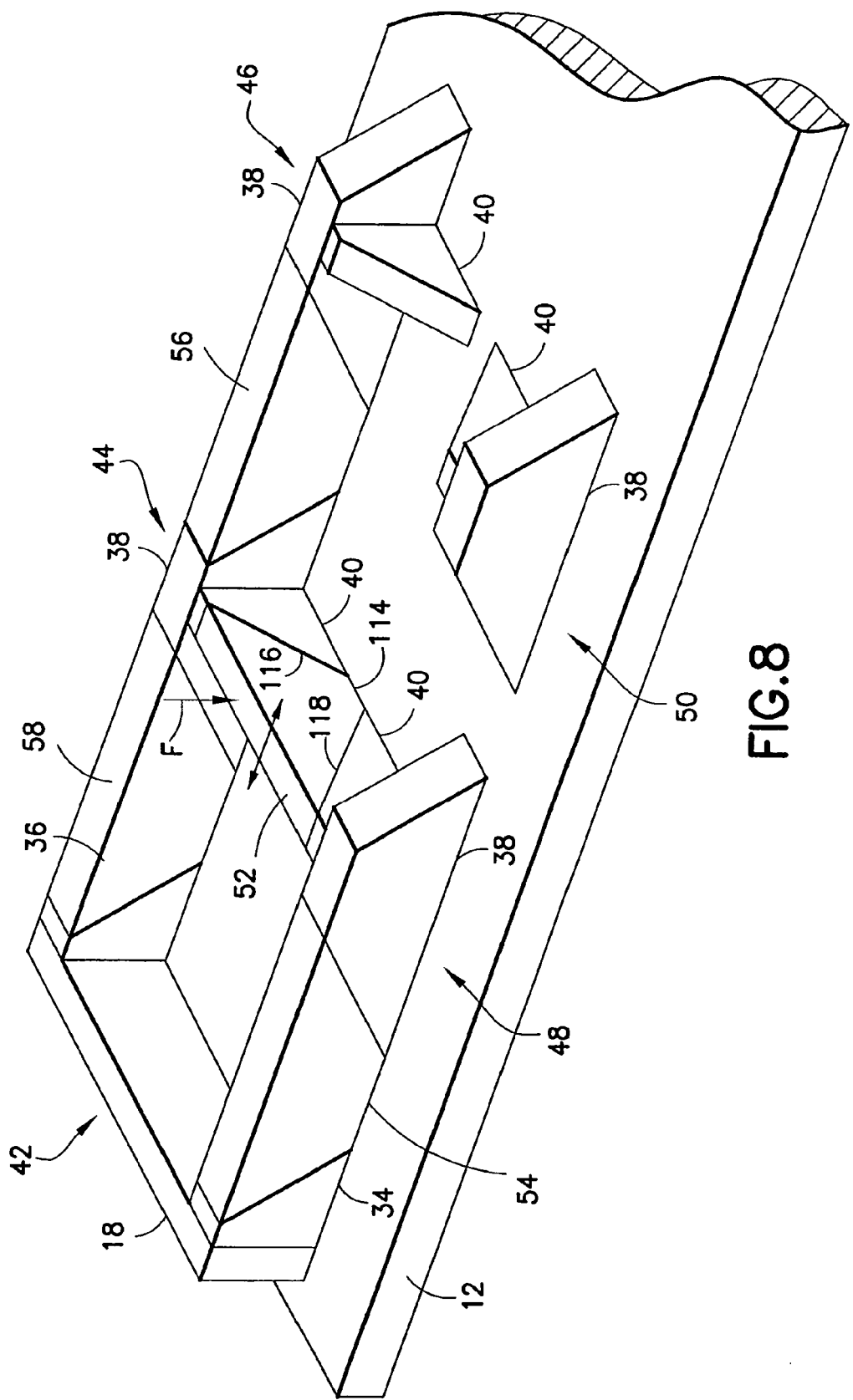

FIG. 6 shows a further stage in the manufacture of the tailored blank partly depicted in FIG. 8, wherein an angled structural member 40 has been friction welded to an angled structural member 38 to form a T-shaped intersection. Each of structural members 38 and 40 has six faces, including a pair of congruent substantially trapezoidal side faces (right trapezoidal in the case of structural member 40 and not right trapezoidal in the case of structural member 38) and four substantially rectangular faces that meet the side faces at respective edges. Each of the six faces of structural members 38 and 40 comprises a substantially planar surface. As seen in FIG. 6, structural member 40 has an inclined face 31 disposed at an oblique angle relative to the bottom face thereof, whereas structural member 38 has two inclined faces 43 and 45 disposed at respective oblique angles relative to the bottom face thereof.

The procedure for friction welding structural member 40 to structural member 38 is the same as that for making the friction-welded intersection seen in FIG. 2. After structural member 40 has been friction welded to structural member 38 as shown in FIG. 6, any flash is removed from the bottom faces by grinding. The respective positions of these structural members are precisely controlled during the friction welding operations so that the bottom faces of structural members 38 and 40 are substantially coplanar. The resulting T-shaped intersection seen in FIG. 6 can be placed with its bottom face in abutting relationship with a base member and friction welded thereto in the course of manufacturing the tailored blank depicted in FIG. 8, as will be explained in further detail hereinafter.

In order to make a tailored blank of the type shown in FIG. 1, the method of manufacture in accordance with the second embodiment calls for the manufacture of two dual-intersection structures of the type seen in FIG. 5 and four T-shaped intersections of the type seen in FIG. 6. The two dual-intersection structures and four T-shaped intersections are each friction welded to a base member or substrate. To facilitate friction welding, each T-shaped intersection can be coupled in turn to an actuator by clamping means previously described with reference to FIG. 3. Different clamping means may be designed to grip each dual-intersection structure during friction welding.

Figure 7:
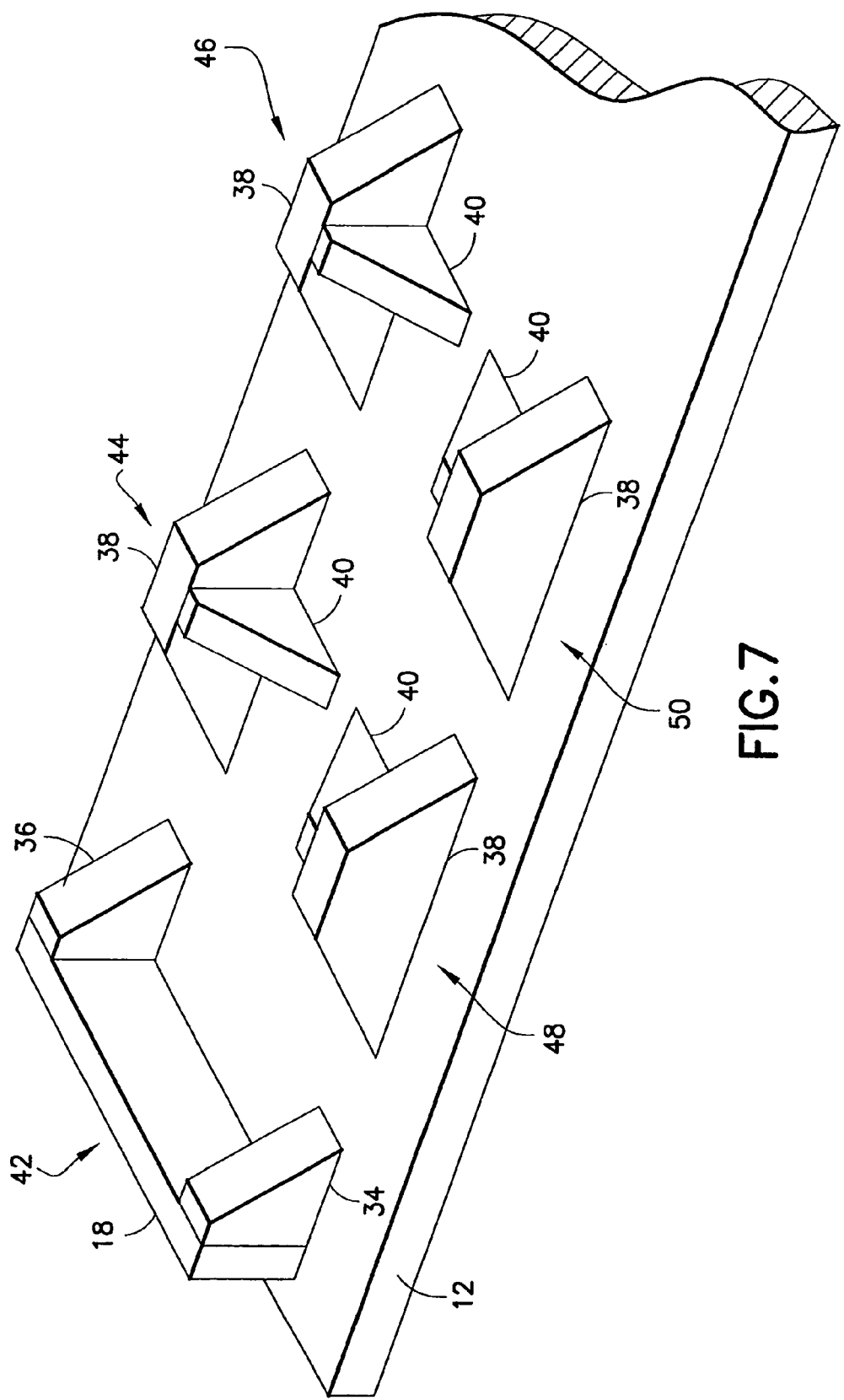
FIGS. 7 and 8 are drawings showing isometric views of respective stages in the manufacture of a tailored blank comprising intersections of the type depicted in FIGS. 5 and 6.

FIG. 7 shows the relative positions of one dual-intersection structure 42 and four T-shaped intersections 44, 46, 48 and 50 after being friction welded to a base member or substrate 12. The second dual-intersection structure is not shown in FIG. 7, but would occupy a position at the end of base member 12 that is opposite to the end of base member 12 where dual-intersection structure 42 is located.

To reduce shearing forces at the weld joint during friction welding of the dual-intersection structures and T-shaped intersections to base member 12, it is preferred that each dual-intersection structure and each T-shaped intersection be reciprocated along a line that is not parallel to the respective weld joint thereof.

Six of the eight intersections are arranged on the base member 12 as shown in FIG. 7. Each friction-welded interface seen in FIG. 7 takes the place of a respective hydropillar friction weld of the similar structure depicted in FIG. 1. The structural members 38 of intersections 44 and 46 are aligned with each other and define a substantially trapezoidal space therebetween. Likewise, the structural member 36 of dual-intersection structure 42 and the structural member 38 of intersection 44 are aligned with each other and define a substantially trapezoidal space therebetween. The same is true for the structural members 38 of intersections 48 and 50, and for the structural member 34 of dual-intersection structure 42 and the structural member 38 of intersection 48. Although not shown in FIG. 7, the other dual-intersection structure likewise comprises structural members similar to structural members 34 and 36, which are respectively aligned with structural members 38 of intersections 46 and 50 and define respective substantially trapezoidal spaces therebetween. Further, the structural members 40 of T-shaped intersections 44 and 48 are mutually aligned and define a substantially trapezoidal space therebetween. The same is true for structural members 40 of T-shaped intersections 46 and 50. Six of eight trapezoidal spaces are shown in FIG. 7.

In accordance with the second embodiment, a respective substantially trapezoidal structural member is linear friction welded in place in each of the aforementioned substantially trapezoidal spaces. FIG. 8 depicts a situation wherein four such substantially trapezoidal structural members 52, 54, 56 and 58 have been welded in place. Each substantially trapezoidal structural member has six faces, including mutually parallel side faces having a substantially trapezoidal shape that matches the substantially trapezoidal space in which it will be welded.

For example, the substantially trapezoidal structural member 52 has a bottom face and two inclined faces disposed at respective oblique angles relative to the bottom face thereof. When structural member 52 is in the position shown in FIG. 8, one inclined face abuts the inclined face of structural member 40 of intersection 44, while the other inclined face abuts the inclined face of structural member 40 of intersection 48. At the same time the bottom face of structural member 52 abuts a corresponding portion of the top surface 13 of base member 12. The three interfaces formed by the bottom and inclined faces of structural member 52 and the abutting surfaces of base member 12 and structural members 40 of intersections 44 and 48 are disposed such that the abutting surfaces rub together when the structural member 52 is reciprocated at high frequency while being urged against the base member 12.

More specifically, structural member 52 can be reciprocated in opposite directions along a line (indicated by a double-headed arrow in FIG. 8) while being urged or pressed against base member 12 in a direction F that is substantially normal to the top surface 13 of the base member. At the same time, a first vector component of the force being exerted in direction F presses one inclined face of structural member 52 against the inclined face of structural member 40 of intersection 44, while a second vector component of the force being exerted in direction F presses the other inclined face of structural member 52 against the inclined face of structural member 40 of intersection 48. As previously disclosed, structural member 52 can be urged against the base member 12 and reciprocated by an actuator (not shown), such as an electric, hydraulic, or pneumatic actuator that is coupled to structural member 52 by clamping means.

The relative motion between structural member 52 and each of intersections 44 and 48 and base member 12 generates frictional heating that plasticizes respective portions of those members at the interfaces of the inclined faces and at the interface of structural member 52 with base member 12. Once sufficient plasticization has occurred, the reciprocating motion of structural member 52 is terminated. Thereafter, the compressive force between structural member 52 and base member 12 is maintained by continuing to urge structural member 52 in direction F against base member 12. At the same time, the first and second vector components of the force being exerted in direction F press the inclined faces of structural member 52 against the inclined faces of structural members 40 of intersections 44 and 48. Under compression, the plasticized material at the inclined interfaces forms weld joints 116 and 118, while the plasticized material at the interface of structural member 52 with base member 12 forms weld joint 114.

Substantially trapezoidal structural members 54, 56 and 58 (and other substantially trapezoidal structural members not shown in FIG. 8) are similarly installed in respective substantially trapezoidal spaces by linear friction welding. The result is a tailored blank in which a rectangular wall having two internal cross members is joined to one side of a base member or substrate. Such a tailored blank can then be trimmed to form a final structural assembly comprising two mutually parallel flanges with ends connected by end connectors and with intermediate portions connected by stiffeners disposed parallel to the end connectors, all joined to one side of a web.

Figure 12:
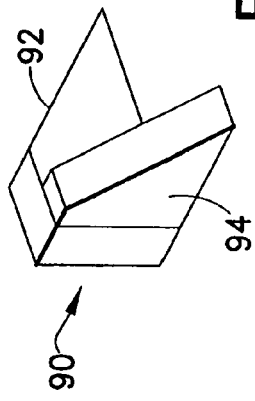
FIG. 12 is a drawing showing an isometric view of an L-shaped intersection of the type seen in FIG. 9.

Alternatively, instead of forming the dual-intersection structure seen in FIG. 5, a pair of L-shaped intersections can be friction welded to the base member in the places that would otherwise have been occupied by the corners of the dual-intersection structure, with a substantially trapezoidal space therebetween. Then a substantially trapezoidal structural member would be installed in the substantially trapezoidal space by linear friction welding in the manner previously described. FIG. 12 shows a representative L-shaped intersection 90 comprising a pair of structural members 92 and 94 each having six faces, including a pair of mutually parallel side faces having a substantially right trapezoidal shape. In the embodiment shown in FIG. 12, a rectangular face of structural member 94 is friction welded to a portion of one of the substantially right trapezoidal side faces of structural member 92, thereby forming a corner or L-shaped intersection 90. The bottom faces of the structural members 92 and 94 are substantially coplanar to facilitate their abutment with a substantially planar top surface of a base member during friction welding of L-shaped intersection 90 to the base member.

Figure 9:
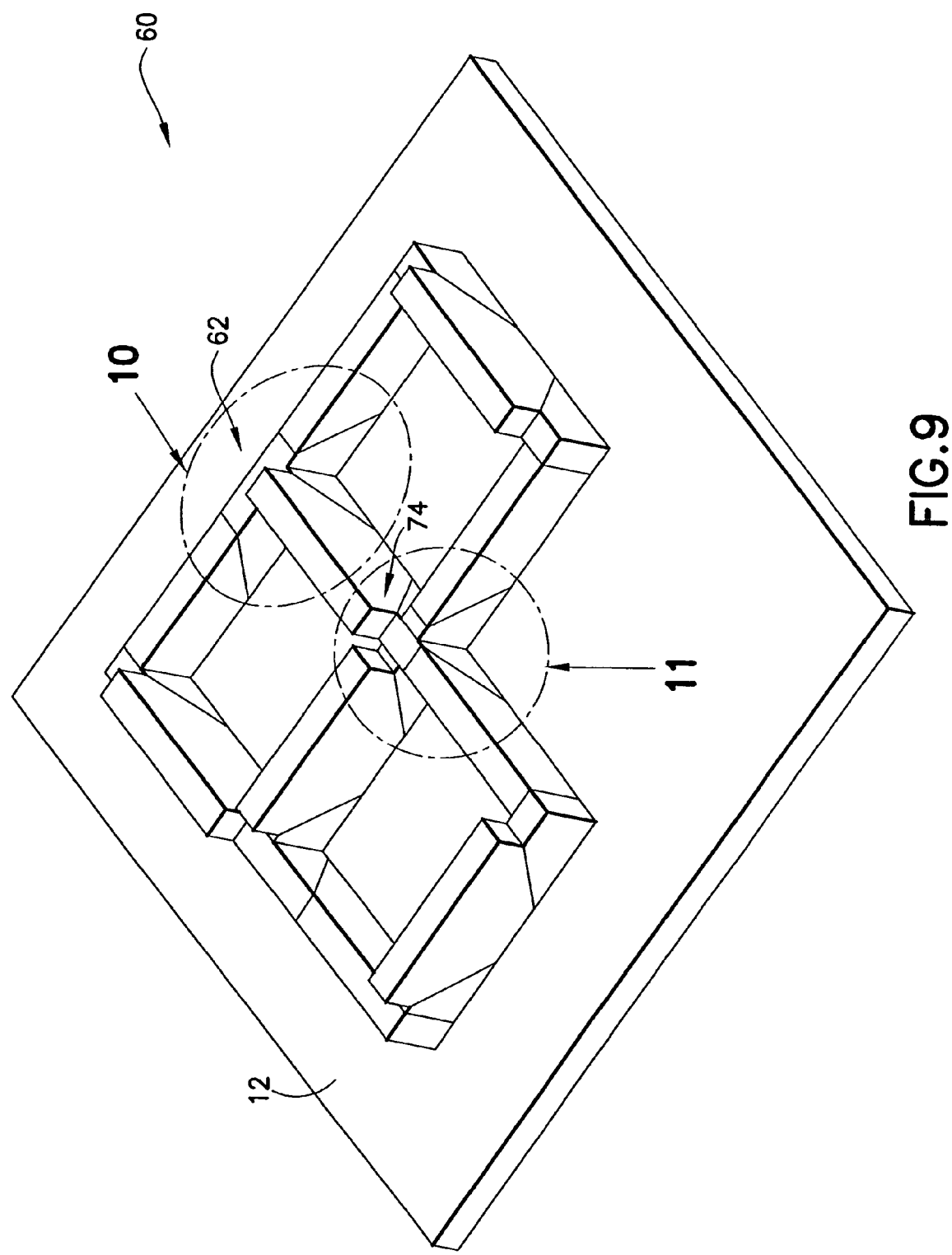
FIG. 9 is a drawing showing an isometric view of respective stages in the manufacture of a tailored blank comprising intersections of the type depicted in FIGS. 11-13.
Figure 11:
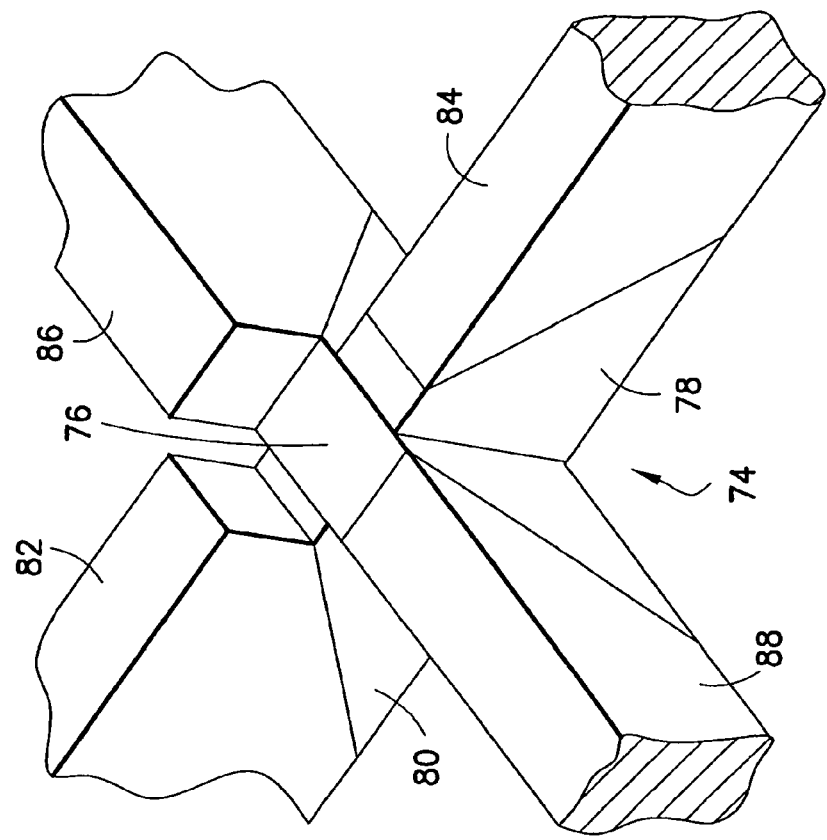
FIG. 11 is a drawing showing an isometric view of the portion of the tailored blank within circle 11 seen in FIG. 9.
Figure 10:
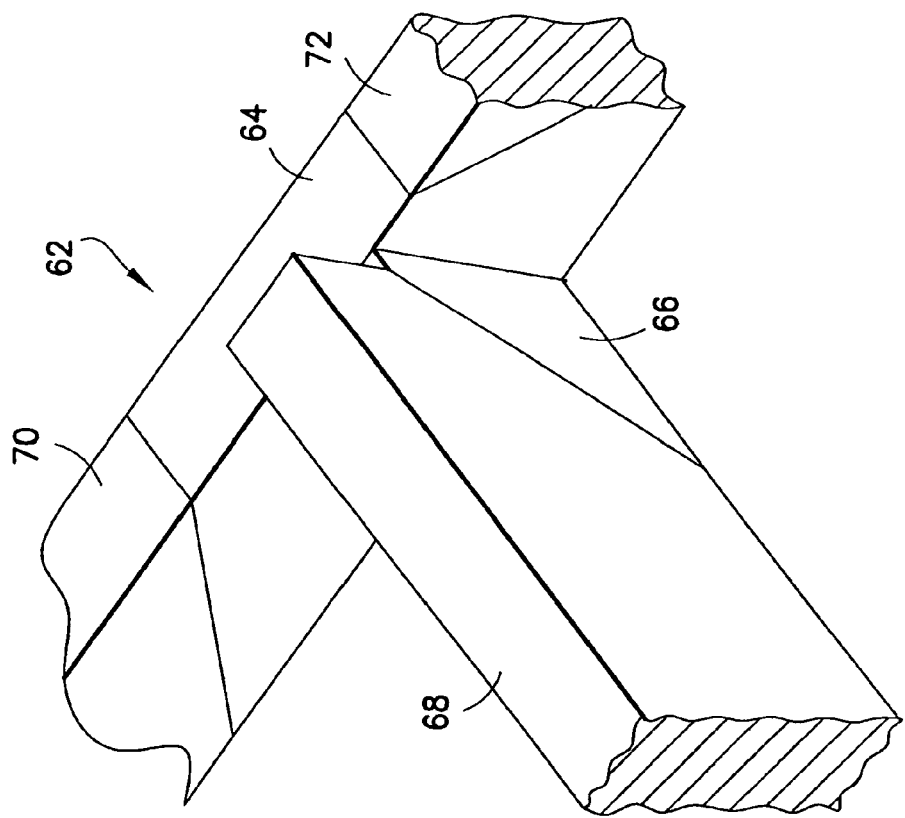
FIG. 10 is a drawing showing an isometric view of the portion of the tailored blank within circle 10 seen in FIG. 9.

FIG. 9 shows a stage in the manufacture of a tailored blank 60 in accordance with a third embodiment. The method of manufacture includes the construction of a T-shaped intersection of the type shown in FIG. 6 and a cross-shaped intersection is disposed in the area demarcated by the dashed circle 10 in FIG. 9, which area is shown on a larger scale in FIG. 10. A cross-shaped intersection is disposed in the area demarcated by the dashed circle 11 in FIG. 9, which area is shown on a larger scale in FIG. 11. An L-shaped intersection is disposed in the area demarcated by the dashed circle 12 in FIG. 9, which area is shown on a larger scale in FIG. 12. After the intersections have been friction welded to the base member 12 in a manner such that substantially trapezoidal spaces separate neighboring intersections, respective substantially trapezoidal structural members are linear friction welded in place in respective substantially trapezoidal spaces in the manner previously described with reference to FIG. 8.

The tailored blank 60 shown in FIG. 9 comprises a T-shaped intersection 62 similar to T-shaped intersection 44 seen in FIG. 8. The T-shaped intersection 62 is shown on an enlarged scale in FIG. 10. A structural member 66 having a substantially right trapezoidal profile is friction welded to a portion of a substantially trapezoidal side face of a structural member 64 having a substantially trapezoidal profile, thereby forming a T-shaped intersection 62 having three angled faces disposed at respective oblique angles relative to substantially coplanar bottom faces of structural members 64 and 66, which form the bottom face of the T-shaped intersection 62. The bottom face of the T-shaped intersection 62 is placed in abutment with a substantially planar top surface of the base member or substrate (not shown in FIG. 10). Then the T-shaped intersection 62 is friction welded to the base member in the manner previously described. Thereafter, structural members 68, 70 and 72 are linear friction welded in place in separate operations. The bottom face of each structural member 68, 70 and 72 is joined to the top surface of the base member during a respective linear friction welding operation. Also, each structural member 68, 70, 72 has a first inclined face that is joined to a corresponding inclined face of the T-shaped intersection 62 concurrently during the same respective linear friction welding operation. Each structural member 68, 70, 72 also has a second inclined face (not shown in FIG. 10) that is joined to other structural members concurrently during the same respective linear friction welding operation.

The tailored blank 60 shown in FIG. 9 further comprises a cross-shaped intersection 74 in FIG. 8. The cross-shaped intersection 74 is shown on an enlarged scale in FIG. 11. First, a structural member 78 having a substantially right trapezoidal profile is friction welded to a portion of a substantially trapezoidal side face of a structural member 76 having a substantially trapezoidal profile, thereby forming a T-shaped intersection having three angled faces disposed at respective oblique angles relative to substantially coplanar bottom faces of structural members 76 and 78. Then a structural member 80 having a substantially right trapezoidal profile is friction welded to a portion of the other substantially trapezoidal side face of structural member 76, thereby forming a cross-shaped intersection 74 having four angled faces disposed at respective oblique angles relative to substantially coplanar bottom faces of structural members 76, 78, 80, which form the bottom face of the cross-shaped intersection 74. The bottom face of the cross-shaped intersection 74 is placed in abutment with the top surface of the base member. Then the cross-shaped intersection 74 is friction welded to the base member in the manner previously described. Thereafter, structural members 82, 84, 86 and 88 are linear friction welded in place in separate operations. The bottom face of each structural member 82, 84, 86 and 88 is joined to the top surface of the base member during linear friction welding. Also, each structural member 82, 84, 86, 88 has a first inclined face that is joined to a corresponding inclined face of the cross-shaped intersection 74 concurrently during the same respective linear friction welding operation. Each structural member 82, 84, 86, 88 also has a second inclined face (not shown in FIG. 11) that is joined to other structural members concurrently during the same respective linear friction welding operation.

Using the methods of forming welded intersections disclosed herein, a structural assembly can be formed from any number of structural members depending on the desired dimensions and configuration of the structural assembly. Further, the configuration and material composition of the structural members can be formed and selected according to the specifications and design requirements of the final structural assembly.

Advantageously, each of the base and structural members can be standard stock items in inventory. As is known in the art, the base and structural members can be formed using any of a multitude of fabricating processes such as milling, casting, die or hand forging, extruding, rolling, and machining. The base and structural members can be formed from materials having high strength-to-weight ratios and good corrosion resistance. For purposes of example only and not limitation, the base and structural members may comprise aluminum, aluminum alloys, titanium, titanium alloys, steel, nickel-based alloys, copper-based alloys, beryllium-based alloys, or mixtures thereof. Further, the base and structural members can be formed from similar or dissimilar materials (provided that the dissimilar materials are of types that can be welded together).

Figure 13:
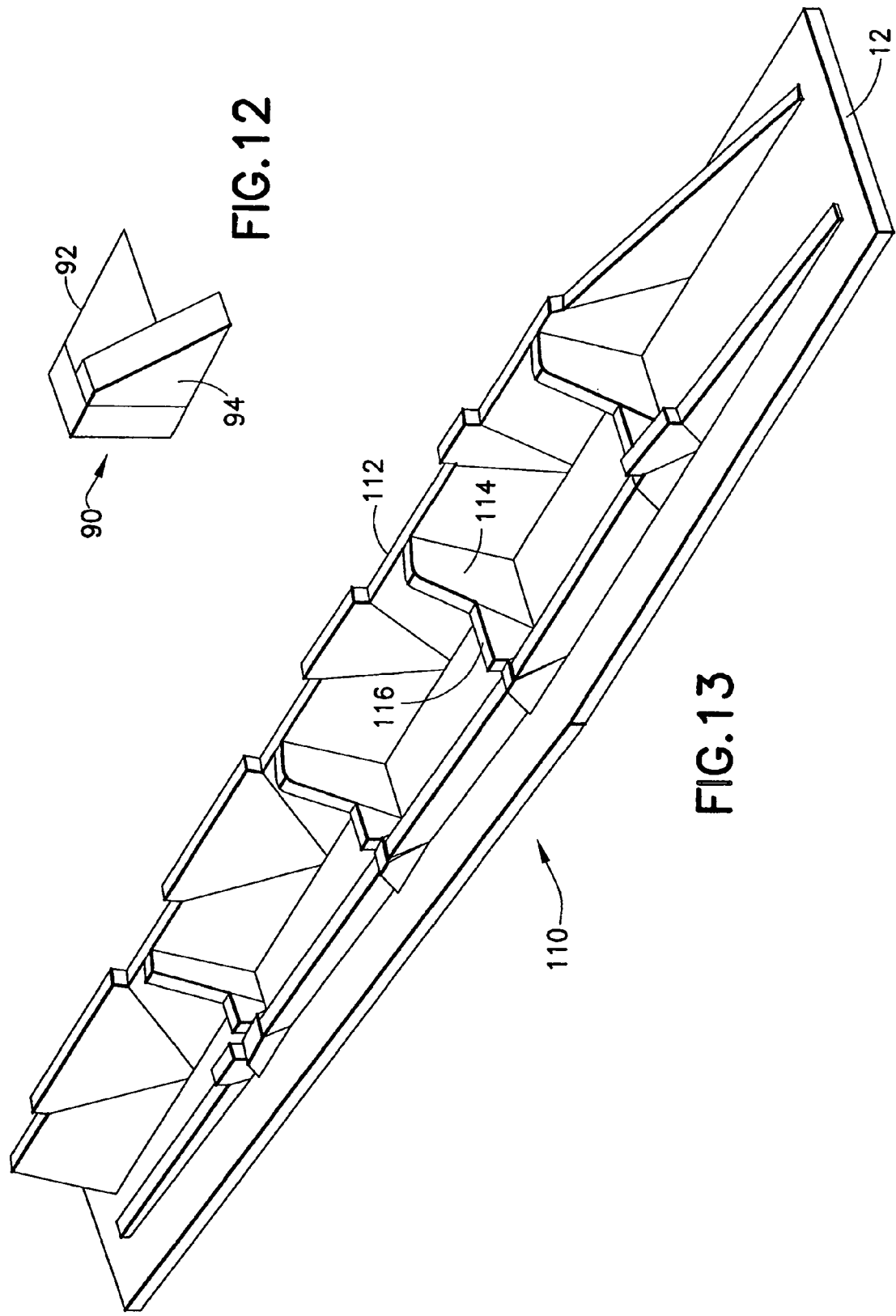
FIG. 13 is a drawing showing a tailored blank having intersections made in two steps.
Figure 14:
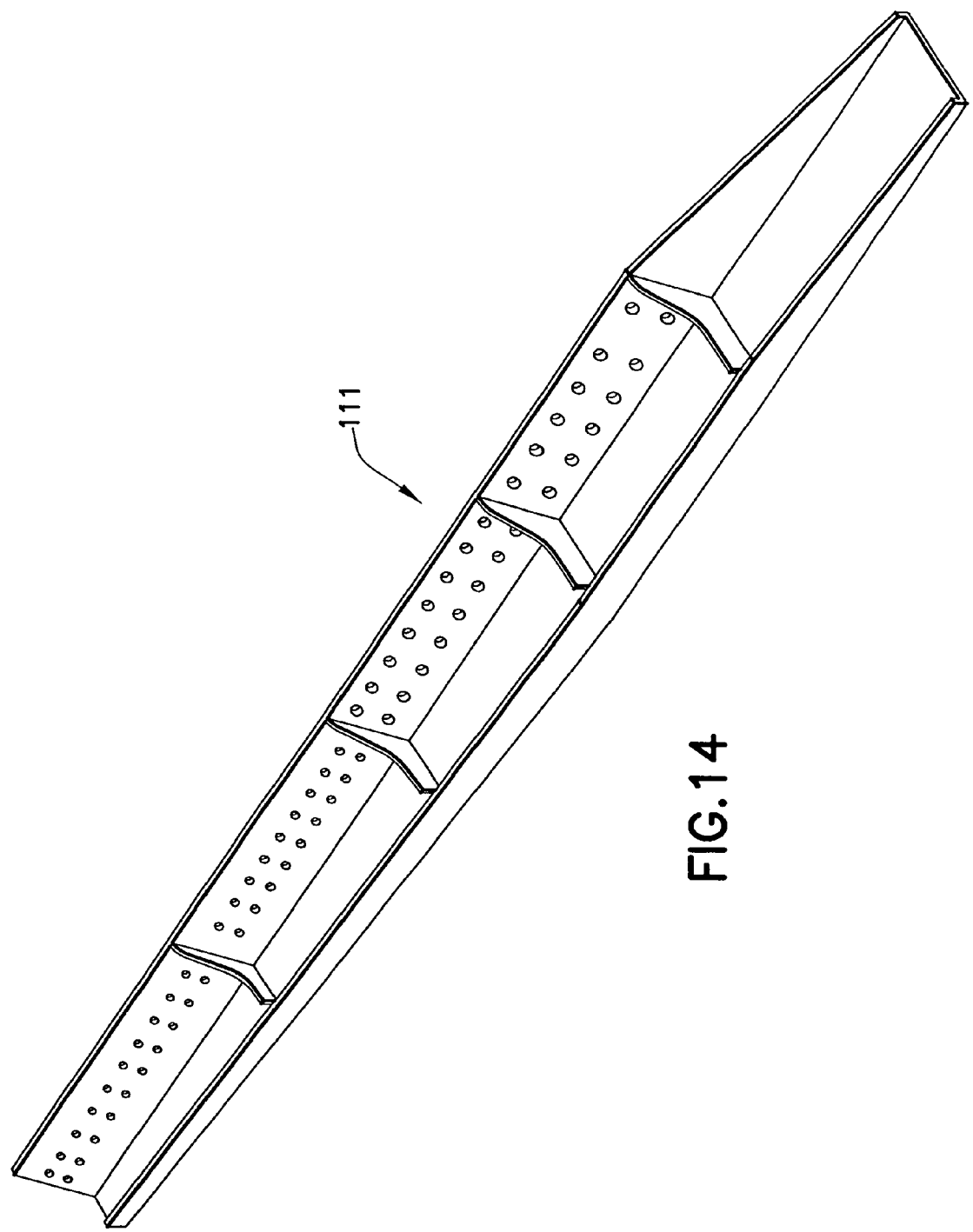
FIG. 14 is a drawing showing a finished structural assembly formed by trimming the tailored blank depicted in FIG. 13.

In addition to the material composition and properties of the base and structural members, the selection of the members is also based on the desired dimensions of the final structural assembly that is to be formed. More specifically, the desired dimensions of the structural assembly can be determined first, and the base and structural members can then be selected so that the resulting tailored blank will correspond in configuration to the final structural assembly, i.e., the configuration of the tailored blank is such that material can be machined or otherwise removed or reconfigured to achieve the dimensions of the finished structural assembly. An exemplary tailored blank 110, made using the friction welding techniques disclosed herein, is shown in FIG. 13. For example, structural members 112, 114 and 116, friction welded to base member 12, are analogous to structural members 38, 40 and 52 seen in FIG. 8, and may be friction welded together using the same techniques disclosed for friction welding structural members 38, 40 and 52 as shown. A finished structural assembly 111 produced by trimming tailored blank 110 is shown in FIG. 14. Advantageously, by constructing tailored blanks having dimensions and configurations closely or substantially approximating the predetermined dimensions and configuration of the corresponding desired final structural assembly, machining time and material waste can be minimized, making the finished structural assemblies more economical to produce.

Many modifications and other embodiments of the invention will come to mind to one skilled in the art to which this invention pertains having the benefit of the teachings presented in the foregoing descriptions and the associated drawings. For example, the structural members can be processed before and/or after joining by friction welding. Such processing can include cleaning the joining surfaces of the structural members to remove oxidation or surface defects. Additionally, the structural members can be heat treated by aging, quenching, stretching, annealing, or solution annealing to obtain desired mechanical or chemical properties, as is known in the art. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The numeric designation of structural members in the claims is arbitrary and merely serves to distinguish one member from another during the arrangement of structural members. This is true for the first through sixth structural members recited in the claims. For example, with respect to claims 1, 4 and 5, the first through fifth structural members can be read on elements 38, 40, 52, 56 and 58 seen in FIG. 8. Alternatively, with respect to claims 10 and 18, the first through fifth structural members can be read on intersections 44 and 48 (each comprising respective elements 38 and 40) and element 52 seen in FIG. 8.

The invention claimed is:

1. A method of making a tailored blank comprising the following steps performed in the order listed:
   (a) placing a first plate in contact with a second plate at a substantially right angle with respect to each other, the first plate having a pair of mutually parallel side faces having the same shape and a bottom face, and the second plate having a pair of side faces, a bottom face, an end face disposed orthogonal to the bottom face of the second plate, and an angled face disposed at an oblique angle relative to the bottom and contact faces of the second plate, wherein the end face of the second plate contacts a portion of one side face of the first plate while the bottom faces of the first and second plates are coplanar and adjoin each other;
   (b) linear friction welding the first and second plates structural members together at an interface of the end face of the second plate and the portion of the one side face of the first plate to form an intersection comprising a T- or L-shaped joining surface formed by the adjoining bottom faces of the first and second plates;
   (c) linear friction welding the entire T- or L-shaped joining surface of the intersection to a first portion of a surface of a base member by reciprocating motion of said intersection, said surface of the base member having an area greater than the area of the T- or L-shaped joining surface of the intersection;
   (d) placing a third plate in contact with the second plate and the base member, the third plate having a pair of substantially right trapezoidal side faces, a bottom face and an angled face disposed at an oblique angle relative to the bottom face of the third plate, wherein the bottom face of the third plate contacts the base member and adjoins the bottom face of the second plate, while the angled face of the third plate contacts the angled face of the second plate; and
   (e) concurrently linear friction welding the bottom face and the angled face of the third plate to a second portion of the surface of the base member and to the angled face of the second plate respectively, the first and second portions of the surface of the base member adjoining each other.

2. The method as recited in claim 1, further comprising the step, performed prior to step (b), of removing flash from the joining surface of the intersection.

3. The method as recited in claim 1, wherein the side faces of the second plate have a shape that is substantially right triangular or substantially right trapezoidal.

4. The method as recited in claim 1, wherein step (c) comprises causing the intersection to reciprocate along a line that is not parallel to the first plate.

5. The method as recited in claim 1, wherein the first and second plates, when friction welded, form a T-shaped intersection.

6. The method as recited in claim 1, wherein the first and second plates, when friction welded, form an L-shaped intersection.

7. The method as recited in claim 1, wherein the side faces of the first plate have a shape that is substantially rectangular or substantially trapezoidal.

8. The method as recited in claim 1, wherein the side faces of the third plate have a shape that is substantially trapezoidal.

9. A method of making a tailored blank comprising the following steps performed in the order listed:
   (a) placing a first plate in contact with a second plate at a substantially right angle with respect to each other, the first plate having a pair of mutually parallel side faces having the same shape and a bottom face, and the second plate having a pair of side faces having the same shape, a bottom face, an end face disposed orthogonal to the bottom face of the second plate, and an angled face disposed at an oblique angle relative to the bottom and contact faces of the second plate, wherein the end face of the second plate contacts a portion of one side face of the first plate while the bottom faces of the first and second plates are coplanar and adjoin each other;
   (b) linear friction welding the first and second plates structural members together at an interface of the end face of the second plate and the portion of the one side face of the first plate;
   (c) placing a third plate in contact with the first plate at a substantially right angle with respect to each other, the third plate having a pair of side faces having the same shape, a bottom face, an end face disposed orthogonal to the bottom face of the third plate, and an angled face disposed at an oblique angle relative to the bottom and contact faces of the third plate, wherein the end face of the third plate contacts a portion of the other side face of the first plate while the bottom faces of the first and third plates are coplanar and adjoin each other;
   (d) linear friction welding the first and third plates structural members together at an interface of the end face of the third plate and the portion of the other side face of the first plate, the result of steps (a) through (d) being an intersection comprising a X-shaped joining surface formed by the adjoining bottom faces of the first, second and third plates;
   (e) linear friction welding the entire X-shaped joining surface of the intersection to a first portion of a surface of a base member by reciprocating motion of said intersection, said surface of the base member having an area greater than the area of the X-shaped joining surface of the intersection;
   (f) placing a fourth plate in contact with the second plate and the base member, the fourth plate having a pair of having a pair of substantially right trapezoidal side faces, a bottom face and an angled face disposed at an oblique angle relative to the bottom face of the fourth plate, wherein the bottom face of the fourth plate contacts the base member and adjoins the bottom face of the second plate, while the angled face of the fourth plate contacts the angled face of the second plate;
   (g) concurrently linear friction welding the bottom face and the angled face of the fourth plate to a second portion of the surface of the base member and to the angled face of the second plate respectively, the first and second portions of the surface of the base member adjoining each other;
   (h) placing a fifth plate in contact with the third plate and the base member, the fifth plate having a pair of substantially right trapezoidal side faces, a bottom face and an angled face disposed at an oblique angle relative to the bottom face of the fifth plate, wherein the bottom face of the fifth plate contacts the base member and adjoins the bottom face of the third plate, while the angled face of the fifth plate contacts the angled face of the third plate; and
   (i) concurrently linear friction welding the bottom face and the angled face of the fifth plate to a third portion of the surface of the base member and to the angled face of the third plate respectively, the first and third portions of the surface of the base member adjoining each other.

10. The method as recited in claim 9, wherein the side faces of the second and third plates have a shape that is substantially right triangular or substantially right trapezoidal.

11. The method as recited in claim 9, wherein step (e) comprises causing the intersection to reciprocate along a line that is not parallel to the first plate.

12. The method as recited in claim 9, wherein the side faces of the first plate have a shape that is substantially trapezoidal.

13. The method as recited in claim 9, wherein the side faces of the fourth and fifth plates have a shape that is substantially trapezoidal.

14. A method of making a tailored blank comprising the following steps performed in the order listed:

(a) placing a first plate in contact with a second plate at a substantially right angle with respect to each other, the first plate having a pair of mutually parallel side faces having the same shape and a bottom face, and the second plate having a pair of side faces having the same shape, a bottom face, an end face disposed orthogonal to the bottom face of the second plate, and an angled face disposed at an oblique angle relative to the bottom and contact faces of the second plate, wherein the end face of the second plate contacts a first portion of one side face of the first plate while the bottom faces of the first and second plates are coplanar and adjoin each other;

(b) linear friction welding the first and second plates structural members together at an interface of the end face of the second plate and the portion of the one side face of the first plate;

(c) placing a third plate in contact with the first plate at a substantially right angle with respect to each other, the third plate having a pair of side faces having the same shape, a bottom face, an end face disposed orthogonal to the bottom face of the third plate, and an angled face disposed at an oblique angle relative to the bottom and contact faces of the third plate, wherein the end face of the third plate contacts a second portion of the one side face of the first plate while the bottom faces of the first and third plates are coplanar and adjoin each other;

(d) linear friction welding the first and third plates structural members together at an interface of the end face of the third plate and the portion of the one side face of the first plate, the result of steps (a) through (d) being an intersection comprising a joining surface formed by the adjoining bottom faces of the first, second and third plates;

(e) linear friction welding the entire joining surface of the intersection to a first portion of a surface of a base member by reciprocating motion of said intersection, said surface of the base member having an area greater than the area of the joining surface of the intersection;

(f) placing a fourth plate in contact with the second plate and the base member, the fourth plate having a pair of substantially right trapezoidal side faces, a bottom face and an angled face disposed at an oblique angle relative to the bottom face of the fourth plate, wherein the bottom face of the fourth plate contacts the base member and adjoins the bottom face of the second plate, while the angled face of the fourth plate contacts the angled face of the second plate;

(g) concurrently linear friction welding the bottom face and the angled face of the fourth plate to a second portion of the surface of the base member and to the angled face of the second plate respectively, the first and second portions of the surface of the base member adjoining each other;

(h) placing a fifth plate in contact with the third plate and the base member, the fifth plate having a pair of substantially right trapezoidal side faces, a bottom face and an angled face disposed at an oblique angle relative to the bottom face of the fifth plate, wherein the bottom face of the fifth plate contacts the base member and adjoins the bottom face of the third plate, while the angled face of the fifth plate contacts the angled face of the third plate; and (i) concurrently linear friction welding the bottom face and the angled face of the fifth plate to a third portion of the surface of the base member and to the angled face of the third plate respectively, the first and third portions of the surface of the base member adjoining each other.

* * * * *